(12) United States Patent
Schwinn

(10) Patent No.: US 7,896,731 B2
(45) Date of Patent: Mar. 1, 2011

(54) COMBINE GRAIN CLEANING SYSTEM INCLUDING A GRAIN CLEANING SIEVE HAVING A REGION OF INCREASED GRAIN THROUGHPUT

(75) Inventor: Kevin S. Schwinn, Orion, IL (US)

(73) Assignee: CNH America LLC, New Holland, PA (US)

( * ) Notice: Subject to any disclaimer, the term of this patent is extended or adjusted under 35 U.S.C. 154(b) by 73 days.

(21) Appl. No.: 12/330,274

(22) Filed: Dec. 8, 2008

(65) Prior Publication Data

US 2010/0144412 A1    Jun. 10, 2010

(51) Int. Cl.
*A01F 12/32* (2006.01)

(52) U.S. Cl. .......................................................... 460/101

(58) Field of Classification Search .................... 460/97, 460/99–102, 120–122
See application file for complete search history.

(56) References Cited

U.S. PATENT DOCUMENTS

| | | | |
|---|---|---|---|
| 3,556,108 A * | 1/1971 | Knapp et al. | 460/97 |
| 5,359,836 A | 11/1994 | Zeuner et al. | 56/10.2 |
| 5,376,046 A * | 12/1994 | Shuknecht et al. | 460/99 |
| 5,463,854 A | 11/1995 | Chmielewski, Jr. et al. | 56/10.2 E |
| 5,524,424 A | 6/1996 | Halgrimson et al. | 56/10.2 D |
| 5,535,577 A | 7/1996 | Chmielewski et al. | 56/10.2 E |
| 5,704,200 A | 1/1998 | Chmielewski, Jr. et al. | 56/10.2 E |
| 7,168,226 B2 | 1/2007 | McLean et al. | 56/10.2 E |
| 7,371,162 B2 * | 5/2008 | Matousek et al. | 460/101 |
| 7,399,223 B2 * | 7/2008 | Weichholdt et al. | 460/101 |
| 2007/0068129 A1 | 3/2007 | Strosser | 56/10.2 E |
| 2007/0204582 A1 | 9/2007 | Coers et al. | 56/10.2 E |
| 2007/0214760 A1 | 9/2007 | Bomleny et al. | 56/10.2 E |

* cited by examiner

*Primary Examiner* — Alicia M Torres
(74) *Attorney, Agent, or Firm* — Michael G. Harms; Patrick M. Sheldrake

(57) ABSTRACT

A cleaning system for an agriculture work vehicle including a combination of a grain cleaning sieve having a limited region containing larger apertures providing increased grain throughput and also increased air throughput relative to the other regions of the sieve, utilized with a fan system that provides a substantially higher air flow rate through the region relative to the other regions of the sieve, such that a downward airborne flow of crop material above and flowing toward the limited region is subject to an air flow having a substantially higher flow rate compared to the other regions above the sieve, which operates to aggressively separate material other than grain from the grain above the limited region, and such that substantially only grain will fall onto and pass through the limited region of the grain cleaning sieve.

18 Claims, 8 Drawing Sheets

COMBINE GRAIN CLEANING SYSTEM INCLUDING A GRAIN CLEANING SIEVE HAVING A REGION OF INCREASED GRAIN THROUGHPUT

TECHNICAL FIELD

This invention relates generally to grain cleaning systems of agricultural combines, and, more particularly, to a cleaning system including a combination of a grain cleaning sieve having a limited region containing larger apertures for increased grain throughput and also increased air throughput relative to the other regions of the sieve utilized in combination with a fan system that provides a substantially higher air flow rate through the limited region relative to the other regions of the sieve to provide more aggressive grain cleaning capability to a downward flow of higher density airborne crop material above and flowing toward the limited region relative to the other regions of the sieve, the system allowing grain accumulation on the limited sieve region insufficient to interfere with the air flow and grain cleaning capability thereabove, less grain spillage over the front edge of the sieve, and grain flow having a lower density of crop material to the other regions of the sieve for enhanced cleaning efficiency in the other regions.

BACKGROUND ART

In the harvesting of crops it is desired that the grain be separated from other elements or portions of the crop, such as from pod or cob fragments, straw, stalks, and the like. Agricultural combines typically have employed a rotary threshing or separating system for separating the grain from such other crop elements or portions. In general, a rotary threshing or separating system includes one or more rotors, which can extend axially (front to rear) or transversely within the body of the combine, and which are partially or fully surrounded by a perforated concave. The crop material is threshed and separated by the rotation of the rotor within the concave, and the separated grain, together with some particles, such as chaff, dust, straw, and crop residue collectively referred to as material other than grain (MOG), are discharged through the perforations of the concave so as to fall onto a grain bed or pan, or so as to fall directly onto the cleaning system itself.

Cleaning systems further separate the grain from MOG and typically include a fan directing an air flow stream upwardly and rearwardly through one or more fore to aft reciprocating sieves. The air flow stream operates to lift and carry the lighter elements of the MOG towards the rear end of the combine for discharge therefrom. Clean grain, being heavier, and larger pieces of MOG, which are not carried away by the air flow stream, will fall onto a surface of an upper sieve where some or all of the clean grain passes through the upper sieve to a lower, finer sieve. Grain and MOG remaining on the sieve surface are physically separated by the reciprocal action of the sieves as the material moves rearwardly therealong. Any grain and/or MOG remaining on the surface of the upper sieve are discharged at the rear of the combine.

The quantity of clean grain and MOG passing through the sieves is typically controllable, in part, by varying the opening size of the sieves. To this end, sieves include rows of fingers, each row supported on, and rotatably adjustable about, a longitudinal axis. These rows of fingers define laterally extending grain passages between confronting surfaces of adjacent rows of fingers. Rotating the rows through various angular positions increases or decreases the opening size of the passages between the adjacent rows. Thus, material passes through the sieve by falling generally vertically through the spaces between the fingers or by entering the passages between the rows and falling through at the angle defined by the angular position of the rows of fingers as the sieve is reciprocated. As the rows of fingers are rotated more towards a vertical orientation, the opening size of the passages between the rows is increased to allow more crop material to fall through the sieve through the lateral passages. If the opening size of the passages is too large, an increased amount of MOG will be allowed to pass through the lateral passages of the sieve. Conversely, as the rows of fingers are rotated more towards a horizontal orientation, the opening size of the passages between the rows is decreased to allow less crop material to fall through the sieve through the spaces between the fingers and the lateral passages. If the opening size of the passages is too small, less MOG is allowed to pass through the sieve, but less clean grain falls through the sieve as well. Therefore, if the sieve passages are opened too much, increased MOG is allowed therethrough, and if the sieve passages are opened too little, less MOG passes therethrough, but grain throughput is reduced.

Typically the threshing system, the grain pan, a pre sieve, or the like, directs a downward flow of crop material toward the upper sieve. A limited portion of the flow of crop material, typically that portion of the flow directed toward the forward portion of the sieve, includes a higher density of grain and MOG than the portion of the flow of crop material directed further rearwardly on the sieve. Often the cleaning fan system is configured to provide an air flow stream at a significantly higher air flow rate near the forward portion of the sieves coincident with the denser portion of the flow of crop material. For one representative combine cleaning system, for example, the rate of the air flow directed through the forward six to eight inches of the upper sieve has been observed at between about seven to about eight hundred cubic feet per minute (without grain present), which has been observed to be approximately twice the rate of air flow beyond this forward region, for instance, at about three to about four hundred cubic feet per minute observed at twelve to fifteen inches from the front of the sieve.

Ideally while the portion of the flow of crop material including the higher density of grain and MOG is airborne en route to the forward portion of the upper sieve, the flow of air at a significantly higher air flow rate generated by the cleaning fan will be directed therethrough for separating the lighter MOG from the heavier grain such that the lighter MOG will be carried rearwardly over the upper sieve, and the heavier, smaller grain will be allowed to fall onto the upper sieve where it can fall through the spaces between the adjacent fingers of the upper sieve to the lower sieve. Thus, by virtue of the air flow through the airborne flow of crop material, some separation of grain from MOG will occur above the surface of the upper sieve, and some separation will occur on the surface of the upper sieve as a function of the opening size and reciprocation of the upper sieve. That is, under ideal conditions, lighter elements of MOG will be carried by the air flow rearwardly over the upper sieve to be discharged in a desired manner from the combine, heavier elements of MOG will be carried rearwardly by the reciprocating action of the sieves, and grain will fall through the openings of the upper sieve.

When in operation, however, the limited portion of the flow of crop material including the increased density of grain and MOG directed toward the forward portion of the upper sieve having standard spacing between sieve fingers, results in crop material collecting and accumulating on the forward portion of the upper sieve. The accumulation of crop material can build to such an extent as to spill over the forward edge of the upper sieve to the clean grain pan bypassing the lower sieve or into the fan housing. Further, the higher rate air flow stream is unable to pass through the openings of the forward portion of the upper sieve to the extent that the ideal airborne separation above the upper sieve is severely limited or not present at all. As a result the amount of grain cleaned at the forward portion of the upper sieve is severely limited or reduced relative to the ideal situation.

Therefore, what is sought is a combine grain cleaning system which overcomes one or more of the disadvantages or problems set forth above.

SUMMARY OF THE INVENTION

What is disclosed is a combine grain cleaning system which overcomes one or more of the disadvantages or problems set forth above.

According to a preferred aspect of the invention, what is disclosed is a cleaning system for a work vehicle including an upper sieve mounted within the work vehicle beneath a threshing system thereof so as to be located in a path of a downward airborne flow of crop material output by the threshing system. The crop material includes a mixture of grain and particles of material other than grain (MOG), including particles lighter than the grain. The flow of crop material includes a first portion containing a significantly higher density of crop material compared to a second portion of the flow. The first portion of the flow of crop material is directed to a first sieve region of a limited extent.

The upper sieve includes the first sieve region, typically a forward region, and a second sieve region beyond the first sieve region being disposed for receiving the second portion of the flow of crop material. The first sieve region includes first fingers configured and oriented to define first spaces therebetween, and the second sieve region includes second fingers configured and oriented to define second spaces therebetween, wherein the first spaces are larger than the second spaces.

A cleaning fan system is configured and operable for directing an air flow stream upwardly through the upper sieve. The air flow stream includes a first air flow portion of limited extent having a significantly higher first air flow rate directed through the first sieve region as compared to a second air flow rate of a second air flow portion directed through the second sieve region. The first air flow portion will interact with the downward airborne flow of the first portion of the flow of crop material above the first sieve region such that substantially only grain will fall onto and through the first sieve region and such that substantially all of the particles of material other than grain being lighter than grain will be propelled beyond the first sieve region. Additionally, the first air flow portion passing through the larger spaces of the first sieve region will generate an air flow condition above the first sieve region which will interact with the downward flow of the first portion of the flow of crop material to separate and propel beyond the first sieve region substantially all of the particles of material lighter than the grain and to allow essentially only grain to fall onto the first sieve region to pass through the larger first sieve spaces. As a result, the grain falls onto the first sieve region for passing through the larger spaces thereof, and the material other than grain is carried by the first air flow portion away from the first sieve region. The cleaning system will also typically include a second lower sieve for additional cleaning of the grain deposited from the upper sieve.

As typically disposed in an agricultural combine, the upper sieve includes a predetermined number of rows of first fingers extending therealong and the second sieve region includes a predetermined number of rows of second fingers extending therealong, wherein confronting surfaces of adjacent rows define grain passages. Each of the rows is supported on an elongate member rotatable about a longitudinal axis through a range of angular positions including positions wherein the passages are larger, generally allowing more grain and more material other than grain to pass through the passages, and positions wherein the passages are smaller, generally allowing less grain and less material other than grain to pass through the passages.

According to an aspect of the invention the first air flow portion directed through the larger first spaces of the first sieve region will allow substantially only grain to pass through the first spaces of the first sieve region, such that adjusting the rows to an angular position wherein the passages are smaller generally allows more grain and less material other than grain to pass through the sieve.

According to another aspect of the invention, the limited extent of the first sieve region is less than about one fourth of a total extent of the sieve in the predetermined direction, usually rearward. Yet another aspect of the invention requires the first sieve region include at least about three rows of first fingers and no more than about ten rows of first fingers.

A feature of the invention related to the first sieve region provides that the first spaces of the first sieve region are at least about one and one half times greater than the second spaces of the second sieve region.

Another feature of the invention relates to the inclusion of baffles and associated structure for directing the first air flow portion through the first sieve region and the second air flow portion through the second sieve region. According to another feature of the invention the first air flow rate of the first air flow portion is at least about one and one half times greater than the second air flow rate of the second air flow portion. Quantitatively, one aspect of the invention provides that the first air flow rate is at least about seven hundred cubic feet per minute and the second air flow rate is less than about four seven hundred cubic feet per minute.

Attendant advantages of the system of the present invention include more clean grain collected near the forward portion of the cleaning system, any crop material accumulation on the forward portion of the upper sieve is insufficient to blunt air flow from the cleaning fan system, less clean grain movement towards the rear portion of the sieve to be separated from MOG a second time thereby increasing the efficiency of the cleaning system, and less grain lost in the cleaning fan system or discharged from the rear of the combine.

These advantages are realized by the combination of features of the present invention wherein the convergence of the downward airborne flow of higher density crop material and the upward flow of the high rate air stream through the limited region of the grain cleaning sieve having larger openings, creates an air flow condition over the limited sieve region such that substantially only grain will fall onto and through the limited sieve region without accumulation sufficient to impact the air flow condition thereabove.

DETAILED DESCRIPTION OF THE INVENTION

Figure 1:
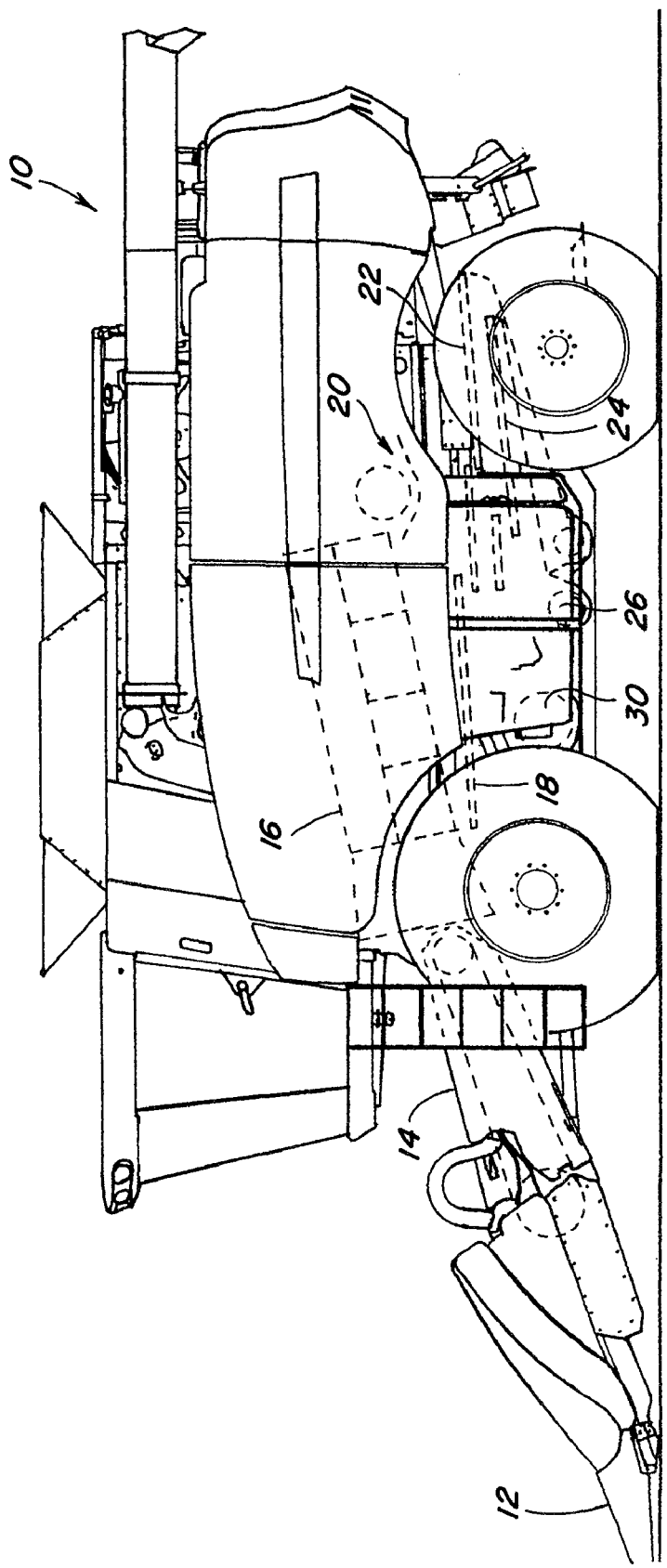
FIG. 1 is a representative simplified side view of an agricultural combine for use with the cleaning system according to the present invention.
Figure 2:
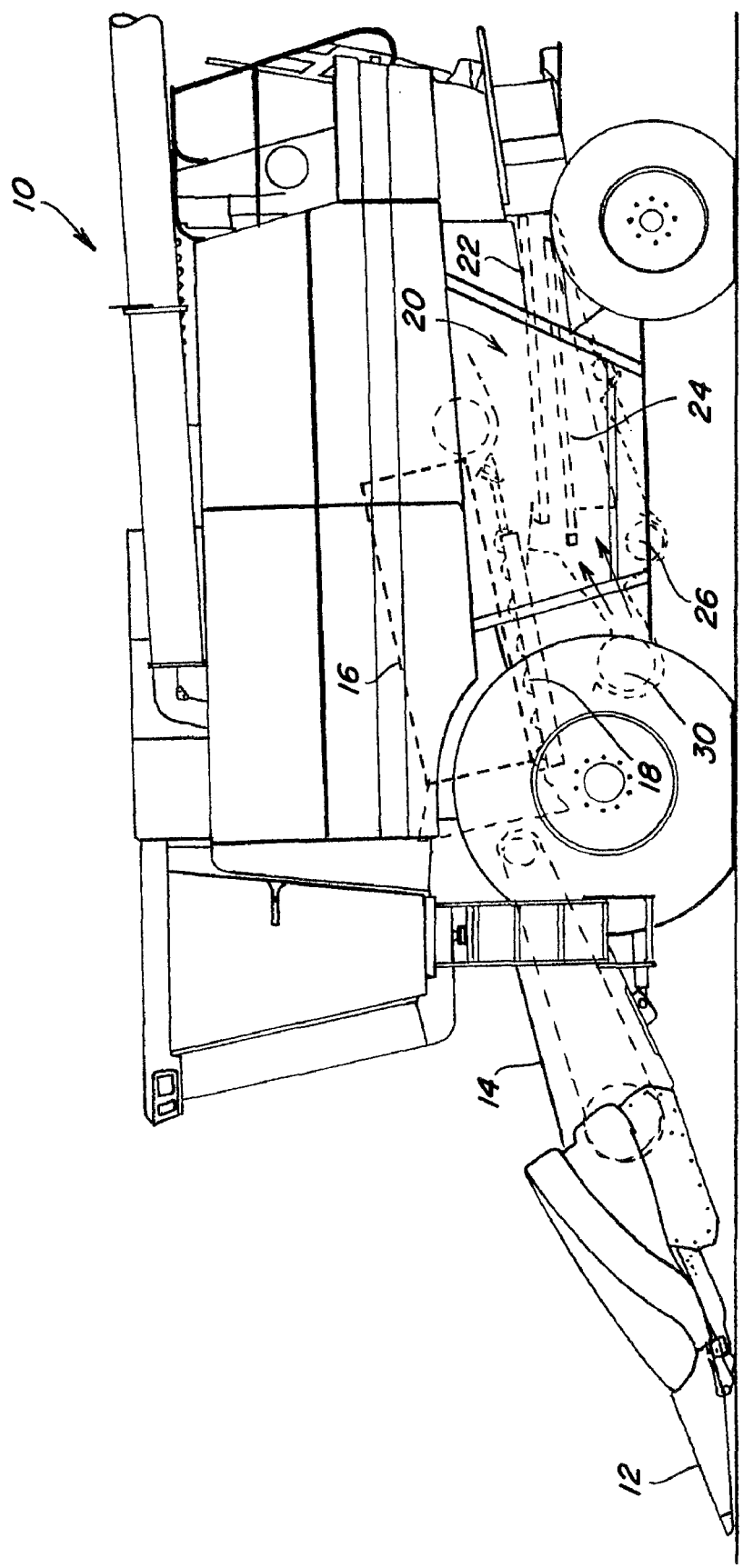
FIG. 2 is a representative simplified side view of another agricultural combine for use with the cleaning system according to the present invention.
Figure 3:
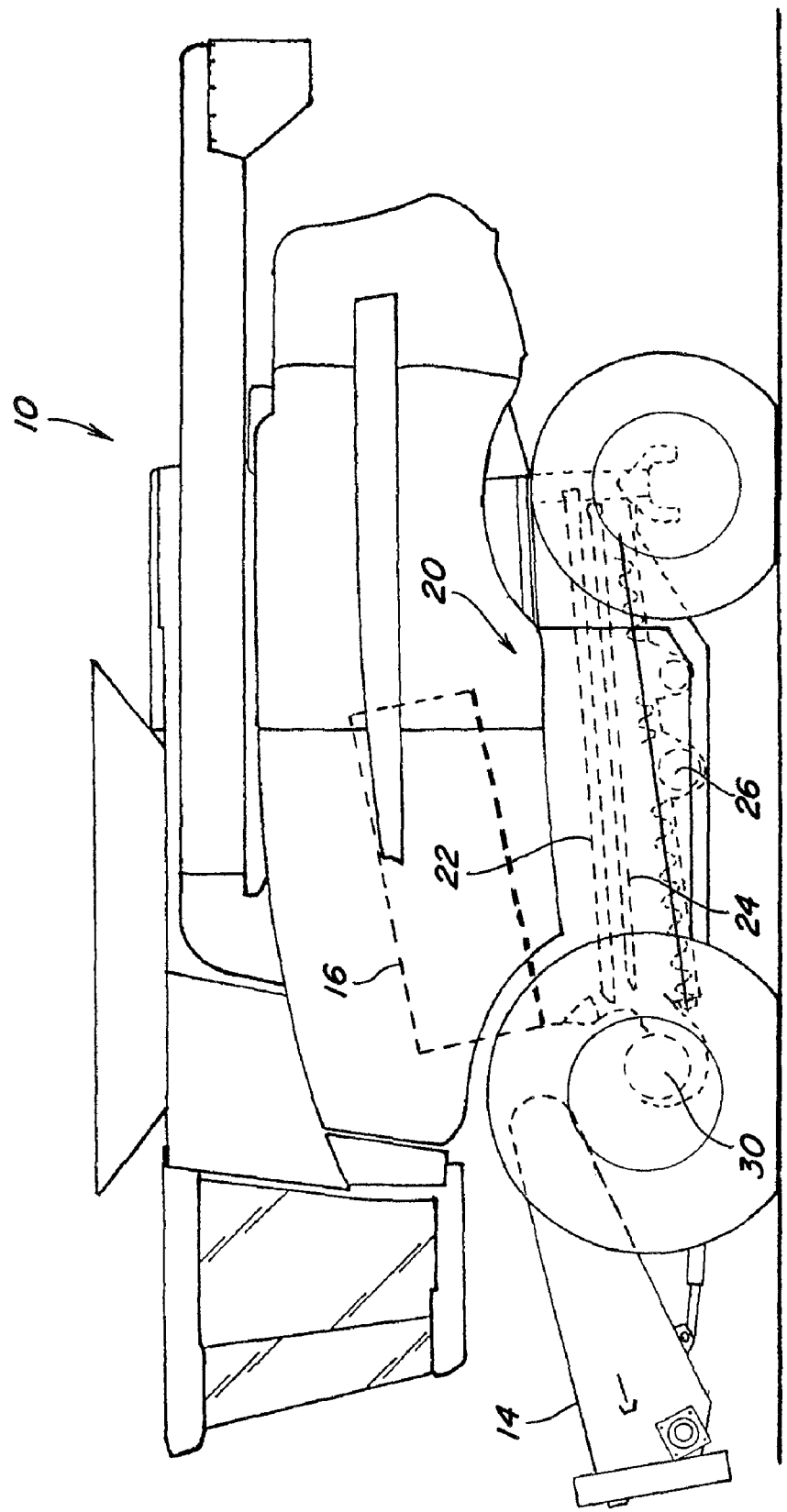
FIG. 3 is a representative simplified side view of yet another agricultural combine for use with the cleaning system according to the present invention.
Figure 4:
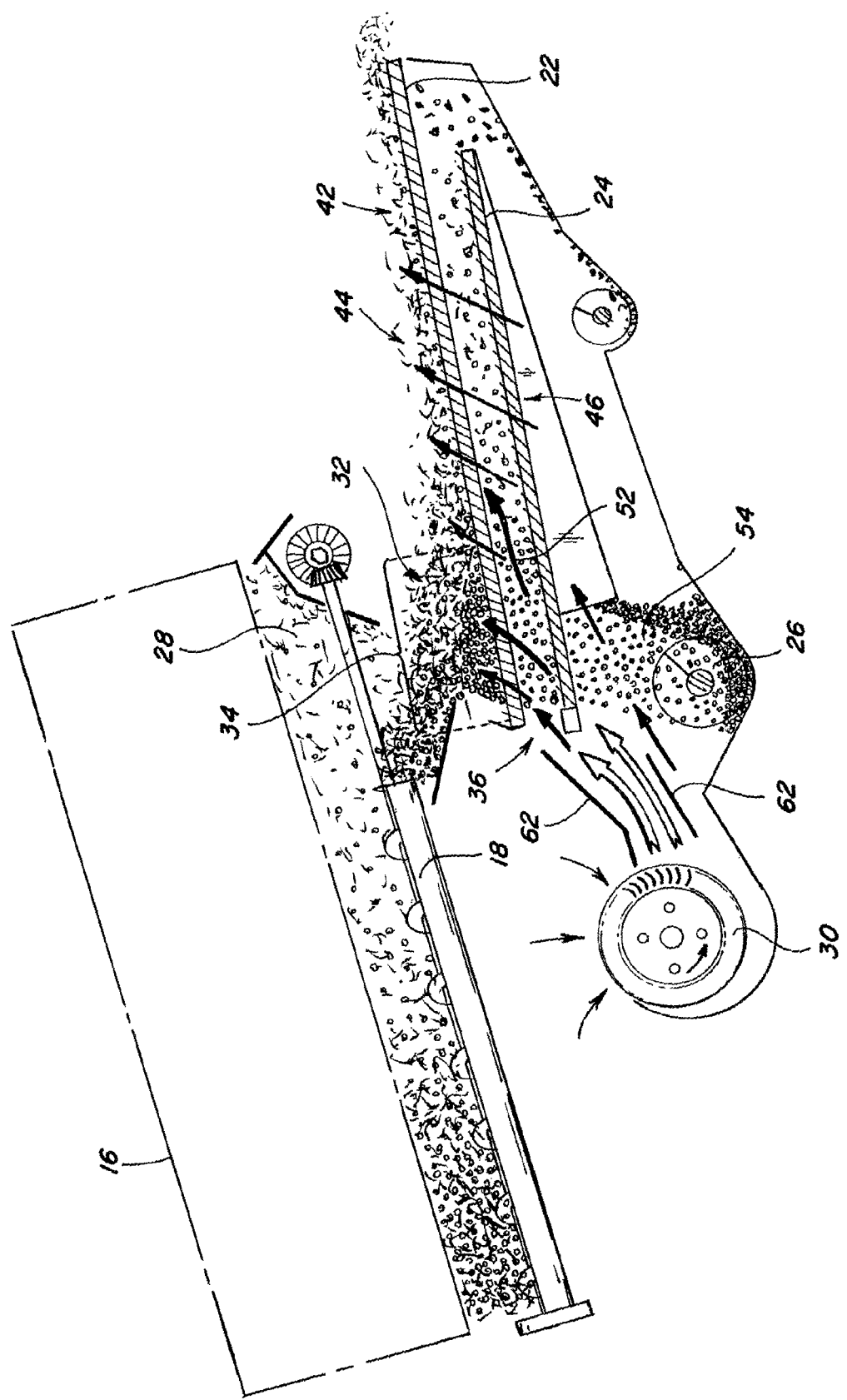
FIG. 4 is a simplified side view of a threshing and separating system and the cleaning system according to the present invention.

Referring now to the drawings, wherein like numbers refer to generally like items or features, FIGS. 1-3 depict three agricultural combines 10 intended to be representative of a wide variety of work machines suitable for use with the present invention, the relevant difference, for purposes of describing the present invention, relating to the conveyance of threshed crop material to a cleaning system 20. Combine 10 includes a header 12 mounted on a front end thereof operable for severing crops from a field during forward motion of combine 10 and a feeder 14 operable for conveying the cut crops to a rotary threshing and separating system 16 within combine 10. Generally threshing and separating system 16 includes one or more rotors at least partially enclosed by and rotatable within a corresponding number of perforated concaves. The cut crops are threshed and separated by the rotation of the rotor within the concave, and smaller elements of crop material including grain and particles of material other than grain (MOG), including particles lighter than grain, such as chaff, dust and straw, are discharged through perforations of the concave. Larger elements, such as stalks, leaves and the like are discharged from the rear of combine 10. As illustrated in FIG. 4, smaller elements of crop material 28 are discharged through the perforations of the concave to a crop material conveyor 18 disposed beneath threshing and separating system 16 for conveyance as a flow of crop material to an upper sieve 22. Crop material conveyor 18 may be a pre sieve as shown in FIG. 1, a grain pan including one or more augers as shown in FIGS. 2 and 4, or other well known suitable conveyance devices. As an alternative, as shown in FIG. 3, smaller elements of crop material may be discharged through the perforations of the concave as a flow of crop material directly to upper sieve 22.

Figure 5:
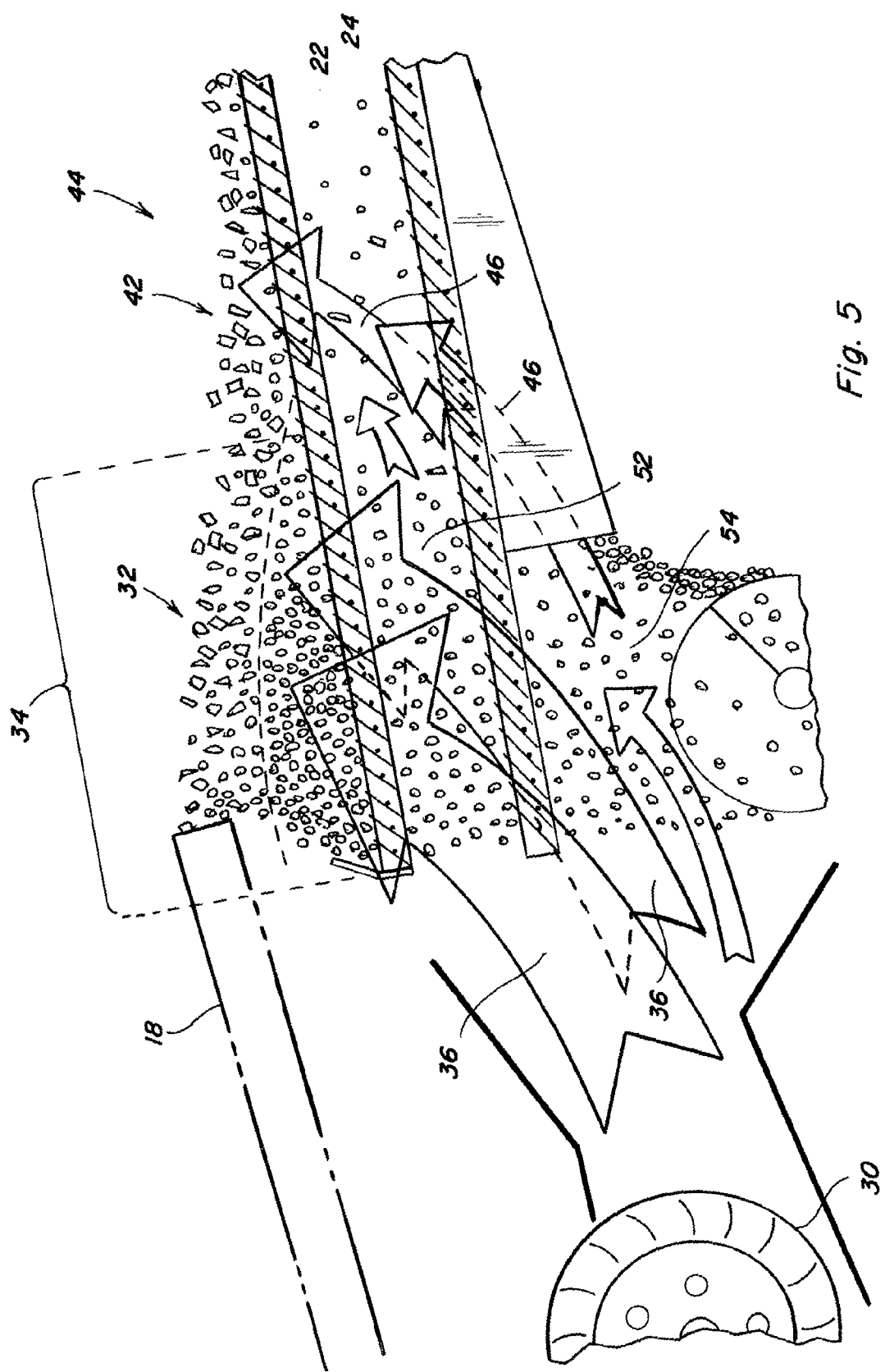
FIG. 5 is a simplified side view of the cleaning system illustrating the combined features of the invention.

Referring now to FIGS. 4 and 5 which depict cleaning system 20 according to the present invention, a downward airborne flow of crop material to sieve 22 includes a first portion 32 containing a significantly higher density of crop material compared to a second portion 42 of the flow beyond first portion 32 in a predetermined direction, typically rearward. Upper sieve 22, seen in FIGS. 4 and 5 and in FIG. 7 in partial view from above, includes a first sieve region 34 of a limited extent, represented by E1, being disposed for receiving first portion 32 of the flow of crop material. First sieve region 34, typically a forward sieve region, includes first fingers 38 configured and oriented to define first spaces 40 therebetween. A second sieve region 44 beyond first sieve region 34 is disposed for receiving second portion 42 of the flow of crop material and includes second fingers 48 configured and oriented to define second spaces 50 therebetween. First spaces 40 are larger than second spaces 50 in at least one direction, as illustrated in FIG. 7 by dimensions measured and represented by S1 and S2, respectively, to allow more grain to pass therethrough.

Figure 7:
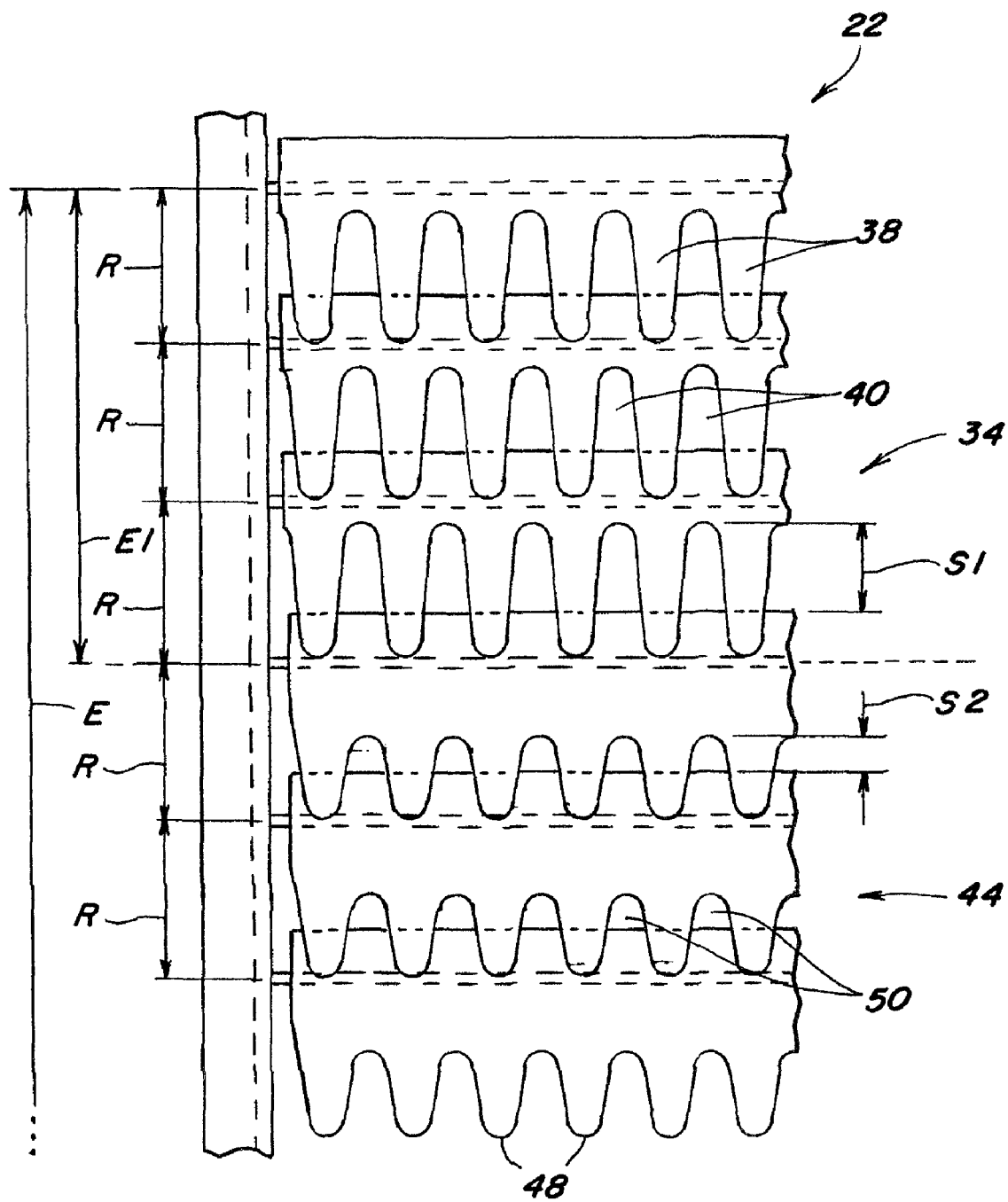
FIG. 7 is a partial, simplified top view of a sieve having a first sieve region including rows of first fingers having first spaces therebetween and a second sieve region including rows of second fingers having second spaces therebetween according to the present invention.
Figure 8:
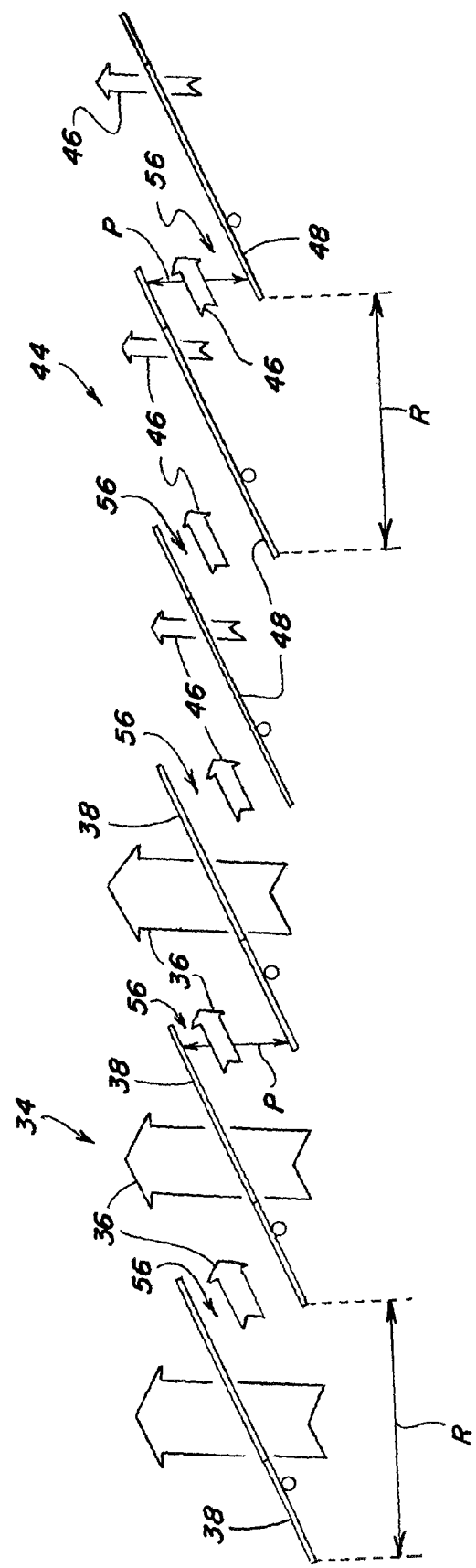
FIG. 8 is a partial, simplified side view of the sieve illustrating representative air flow at the first sieve region and the second sieve region.

In one feature of the invention, limited extent E1 of first sieve region 34 is less than one fourth of a total extent E of the sieve in the predetermined direction, usually rearward, as illustrated in FIG. 7. According to another feature of the invention, first sieve region 34 includes at least about three (3) rows of first fingers 38. Three (3) rows of fingers are illustrated in FIGS. 7 and 8 for purposes of this description. In yet another embodiment, first sieve region 34 includes at least about three (3) and no more than about ten (10) rows of first fingers 38. According to yet another feature of the invention, first spaces 40 of first sieve region 34 are at least one and one half times greater than second spaces 50 of second sieve region 34 as illustrated by S1 and S2 of FIG. 7.

A cleaning fan system 30 is configured and operable for directing an air flow stream upwardly through upper sieve 22. The air flow stream includes a first air flow portion 36 of limited extent having a significantly higher first air flow rate directed through first sieve region 34 as compared to a second air flow rate of a second air flow portion 46 directed through second sieve region 44, the relative air flow rates denoted by larger and smaller sizes of arrows 36 and 46, respectively.

According to one feature of the invention, fan system 40 includes baffles and associated structure 62 (FIG. 4) for directing first air flow portion 36 through first sieve region 34 and second air flow portion 46 through second sieve region 44. According to one aspect of the invention, the first air flow rate of first air flow portion 36 is at least about one and one half times greater than the second air flow rate of second air flow portion 46. More specifically, another aspect of the invention requires that the first air flow rate be at least about seven hundred (700) cubic feet per minute. Yet another aspect of the invention requires that the second air flow rate be less than about four hundred (400) cubic feet per minute.

Thus according to the invention, first air flow portion 36 will interact with the downward airborne flow of first portion 32 of the flow of crop material above first sieve region 34 such that substantially only grain will fall onto and through first sieve region 34 and such that substantially all of the particles of MOG being lighter than the grain will be propelled beyond first sieve region 34. Additionally, first air flow portion 36 passing through larger first spaces 40 of first sieve region 34 will generate an air flow condition above first sieve region 34 which will interact with the downward flow of first portion 32 of the flow of crop material to separate and propel beyond first sieve region 34 substantially all of the particles of MOG and to allow essentially only grain to fall onto first sieve region 34 to pass through larger first sieve spaces 40. As a result, the grain falls onto first sieve region 34 for passing therethrough, and MOG is carried by first air flow portion 36 away from first sieve region 34.

Second air flow portion 46 directed through second sieve region 44, along with the reciprocating action of upper sieve 22 separates grain from MOG in second portion 42 of the crop flow as the crop material moves rearwardly along second sieve region 44 of sieve 22 in the usual manner. Crop material, including mostly MOG, remaining in second portion 42 of the crop flow which does not pass through upper sieve 22, is discharged from the rear of combine 10. Grain and any MOG 52 passing through upper sieve 22 falls to lower sieve 24 for further cleaning, and clean grain 54 passing through lower sieve 24 falls to a clean grain pan 26 for collection in the well known manner.

As illustrated in FIGS. 7 and 8, according to one aspect of the invention, first sieve region 34 includes a predetermined number of rows of first fingers 38 extending therealong, and second sieve region 44 includes a predetermined number of rows of second fingers 48 extending therealong. It is important to note that each of the rows of fingers is attached to an elongate member in the well know manner and spacing R between rows in first sieve region 34 and rows in second sieve region 44 is the same. As seen in FIG. 8 confronting surfaces of adjacent rows define grain passages 56. The rows are supported on the elongate member rotatable about a longitudinal axis through a range of angular positions including positions wherein passages 56 are larger, generally allowing more grain and MOG to pass therethrough, and positions wherein passages 56 are smaller, generally allowing less grain and MOG to pass therethrough. As shown in FIG. 8 for a particular passage 56 of size P, first air flow portion 36 directed through larger first spaces 40 of first sieve region 34 results in considerably more air flow above first sieve region 34 as compared to the air flow above second sieve region 44.

According to the combined features of the invention, first air flow portion 36 directed through larger first spaces 40 of first sieve region 34 will allow substantially only grain to pass through first spaces 40 of first sieve region 34. Therefore adjusting the rows to an angular position wherein passages 56 are smaller results in substantially only grain passing through first sieve region 34 and overall more grain and less MOG passing through sieve 22. Decreasing the density of crop material in second portion 42 of the flow of grain by allowing more grain to pass through first sieve region 34 increases the efficiency of separation of the thinner layer of crop material at second sieve region 44, thereby increasing effectiveness of upper sieve 22 overall.

Figure 6:
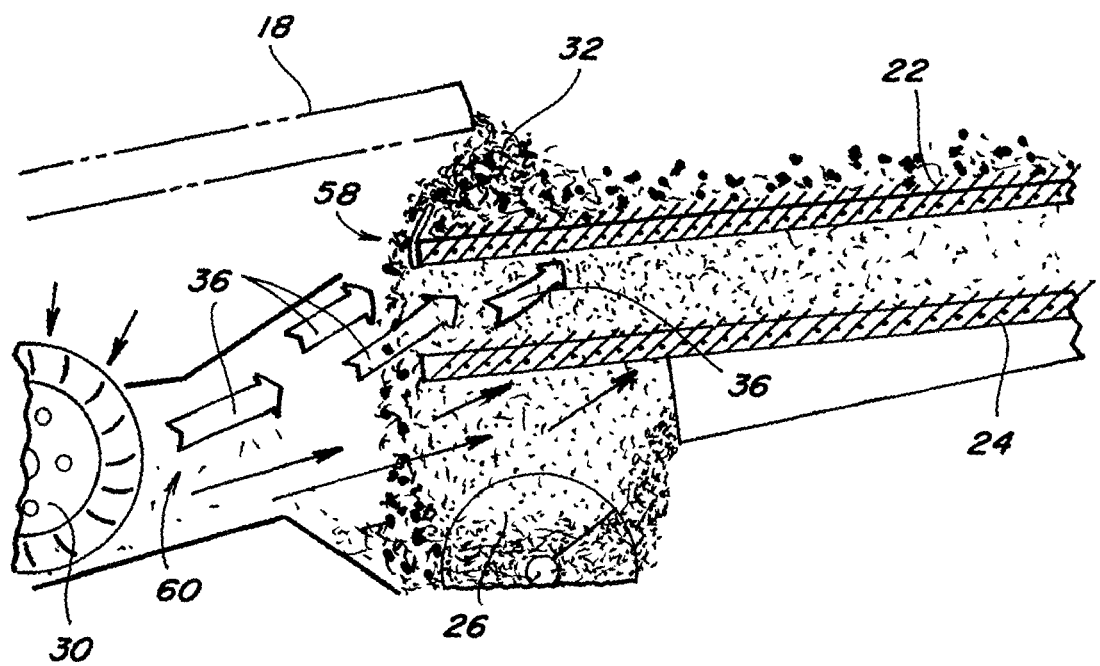
FIG. 6 is a simplified side view of a prior art cleaning system illustrating an observed situation during the cleaning process.

Turning to FIG. 6 which depicts a situation observed during harvesting using systems known in the art. First portion 32 of the flow of crop material falls to a forward end of upper sieve 22 coincident with first air flow portion 36. It has been observed, however, that rather than the grain falling through upper sieve 22, crop material accumulates at the forward end of upper sieve 22 as shown in FIG. 6. Because of this accumulation of crop material, first air flow portion 36 is blunted and/or redirected to other portions of cleaning system 20. Some of the accumulated crop material 58 may fall over the forward end of upper sieve 22 to clean grain pan 26 without the benefit of the additional cleaning provided by lower sieve 24. Crop material 60 may also fall into the structure or housing of fan system 30 where it may interfere with the function of fan system 30 or accumulate within the fan system 30, and, over time, may cause or contribute to difficulties in the operation of thereof.

In contrast, the combination of features of the present invention, namely first portion 32 of the flow of crop material delivered concurrently with first air flow portion 36 directed through first sieve region 34, creates an air flow condition over first sieve region 34 such that substantially only grain will fall onto and through first sieve region 34 without accumulation thereon sufficient to impact the air flow condition thereabove, and such that substantially all the MOG will be propelled away from first sieve region 34. As indicated above, increasing the opening size on sieve 22 typically allows more grain but also allows more MOG to fall through. However, according to the combination of the features of the present invention, larger first spaces 40 of first sieve region 34 serve a dual purpose. First, larger spaces 40 allow higher rate first air flow portion 36 to pass through the limited extent E1 of first sieve region 34 to create an air flow condition sufficient to allow substantially only grain to fall onto and through first sieve region 34 and to propel substantially all of the MOG beyond first sieve region 34. Second, larger spaces 40 allow more grain to fall through the limited extent E1 of first sieve region 34, limiting accumulation of grain and preventing blunting of first air flow portion 36, thus maintaining the air flow condition above first sieve region 34. This condition is illustrated in FIGS. 4 and 5 by the dashed lines above first sieve region 34 below which substantially only grain passes onto first sieve region 34 and beyond which substantially all of the MOG is propelled. As a result of the combination of features of the invention, the convergence of the downward airborne flow of higher density crop material and the upward flow of the high rate air stream through the limited region of the grain cleaning sieve having larger openings, creates an air flow condition over the limited sieve region such that substantially only grain will fall onto and through the limited sieve region without accumulation sufficient to impact the air flow condition thereabove.

Attendant advantages of the system of the present invention include more grain cleaning and throughput by the forward portion of the cleaning system, the forward region of the upper sieve accumulates only clean grain, and not to the extent so as to impede air flow through the forward region of the sieve or sufficient to reduce the air flow condition above the forward region of the sieve that provides the high grain cleaning capability.

In light of all the foregoing, it should thus be apparent to those skilled in the art that there has been shown and described a cleaning system for an agricultural work vehicle including a sieve having a region of increased grain throughput. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A cleaning system for a work vehicle comprising:
a sieve mounted within the work vehicle beneath a threshing system thereof so as to be located in a path of a downward airborne flow of crop material output by the threshing system, the crop material including a mixture of grain and particles of material other than grain, including particles lighter than the grain, the flow of crop material having a first portion containing a significantly higher density of crop material compared to a second portion of the flow beyond the first portion in a predetermined direction;
the sieve having a first sieve region of a limited extent being disposed for receiving the first portion of the flow of crop material, and including a plurality of rows of first fingers, wherein each row includes a series of first fingers having first spaces extending laterally therebetween, and a second sieve region beyond the first sieve region being disposed for receiving the second portion of the flow of crop material, and including a plurality of rows of second fingers, wherein each row includes a series of second fingers having second spaces extending laterally therebetween wherein the first spaces of the first sieve region are at least about one and one half times greater than the second spaces of the second sieve region; and a fan system configured and operable for directing an air flow stream upwardly through the sieve, the air flow stream having a first air flow portion of limited extent having a significantly higher first air flow rate directed through the first sieve region as compared to a second air flow rate of a second air flow portion directed through the second sieve region, such that the first air flow portion will interact with the downward airborne flow of the first portion of the flow of crop material above the first sieve region such that substantially only grain will fall onto and through the first sieve region and such that substantially all of the particles of material other than grain being lighter than grain will be propelled beyond the first sieve region, wherein baffles are adjacent to the fan system for directing the first air flow portion through the first sieve region and the second air flow portion through the second sieve region.

2. The cleaning system according to claim 1 further including a structure positioned and configured for directing the first portion of the flow of crop material to the first sieve section and the second portion of the flow of crop material to the second sieve region.

3. The cleaning system according to claim 2 wherein the structure is a grain pan.

4. The cleaning system according to claim 2 wherein the structure is a pre sieve.

5. The cleaning system according to claim 2 wherein the structure is the threshing system.

6. The cleaning system according to claim 1 wherein the first sieve region includes a predetermined number of rows of the first fingers extending therealong and the second sieve region includes a predetermined number of rows of the second fingers extending therealong, wherein confronting surfaces of adjacent ones of the rows define grain passages, each of the rows being supported on an elongate member rotatable about a longitudinal axis through a range of angular positions including positions wherein the passages are larger, generally allowing more grain and more material other than grain to pass through the passages, and positions wherein the passages are smaller, generally allowing less grain and less material other than grain to pass through the passages, and the first air flow portion directed through the larger first spaces of the first sieve region will allow substantially only grain to pass through the first spaces of the first sieve region, such that adjusting the rows to an angular position wherein the passages are smaller generally allows more grain and less material other than grain to pass through the sieve.

7. The cleaning system according to claim 1 wherein the limited extent of the first sieve region is less than about one fourth of a total extent of the sieve in the predetermined direction.

8. The cleaning system according to claim 1 wherein the first air flow rate is at least about one and one half times greater than the second air flow rate.

9. A cleaning system for an agricultural work vehicle comprising:

a reciprocating sieve mounted within the cleaning system of the work vehicle, the sieve including a plurality of rows of fingers wherein confronting surfaces of adjacent rows define lateral grain passages therebetween, the fingers extending laterally along the rows in spaced apart side by side relation defining spaces therebetween, the sieve including a first sieve region of a limited extent having a predetermined first number of rows of fingers configured to define first spaces, wherein the first spaces extend laterally between the first fingers, and a second sieve region beyond the first sieve region in a predetermined direction having a predetermined second number of rows of fingers configured to define second spaces, wherein the second spaces extend laterally between the second fingers, the first spaces being larger than the second spaces;

the sieve disposed in relation to a threshing system to receive a downward flow of airborne crop material including grain and particles of material other than grain, including particles lighter than the grain, the flow of crop material including a first portion containing a significantly higher density of crop material compared to a second portion of the flow beyond the first flow, the first sieve region disposed to receive the first portion of the downward flow of airborne crop material, the second sieve region disposed for receiving the second portion of the flow of crop material; and a fan system disposed below the sieve and configured for directing an air flow stream through the sieve, the air flow stream including a first air flow portion, of a limited extent, directed through the first sieve region at a first air flow rate and a second air flow portion directed through the second sieve region at a second air flow rate, the first air flow rate being at least about one and one half times greater than the second air flow rate, such that the first air flow portion through the larger first spaces of the first sieve region will generate an air flow condition above the first sieve region which will interact with the downward flow of the first portion of the flow of crop material to separate and propel beyond the first sieve region substantially all of the particles of material lighter than the grain and to allow essentially only grain to fall onto the first sieve region to pass through the larger first sieve spaces, wherein baffles are adjacent to the fan system for directing the first air flow portion through the first sieve region and the second air flow portion through the second sieve region.

10. The cleaning system according to claim 9 further including a structure positioned and configured for directing the first portion of the flow of crop material to the first sieve section and the second portion of the flow of crop material to the second sieve region.

11. The cleaning system according to claim 10 wherein the structure is a grain pan.

12. The cleaning system according to claim 10 wherein the structure is a pre sieve.

13. The cleaning system according to claim 9 wherein each of the rows of the fingers is supported on an elongate member rotatable about a longitudinal axis through a range of angular positions including positions wherein the grain passages are larger, generally allowing more grain and more material other than grain to pass through the passages, and positions wherein the grain passages are smaller, generally allowing less grain and less material other than grain to pass through the passages, and the air flow condition generated above the first sieve region by the first air flow portion directed through the larger first spaces of the first sieve region will allow substantially only grain to pass through the first spaces of the first sieve region, such that adjusting the rows to an angular position wherein the passages are smaller generally allows more grain and less material other than grain to pass through the sieve.

14. The cleaning system according to claim 9 wherein the first sieve region includes at least about three rows of first fingers.

15. The cleaning system according to claim 14 wherein the first sieve region includes no more than about ten rows of first fingers.

16. The cleaning system according to claim 9 wherein the first air flow rate is at least about seven hundred cubic feet per minute.

17. The cleaning system according to claim 9 wherein the second air flow rate is less than about four hundred cubic feet per minute.

18. The cleaning system according to claim 9 wherein the grain passes through the first sieve region prior to accumulation thereon sufficient to impact the air flow condition thereabove.

* * * * *